United States Patent Office
2,875,352
Patented Feb. 24, 1959

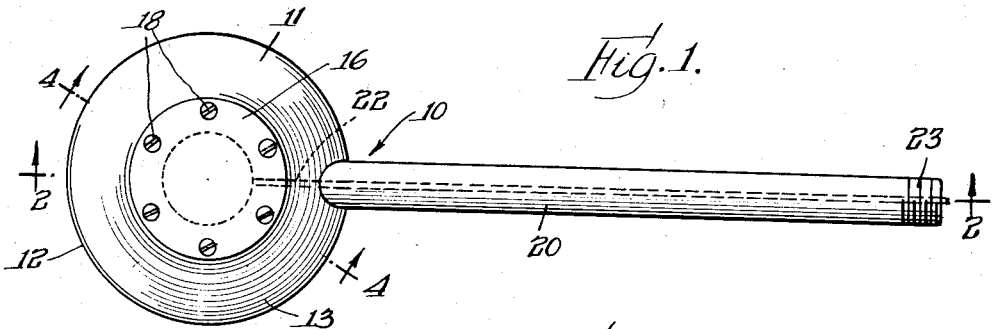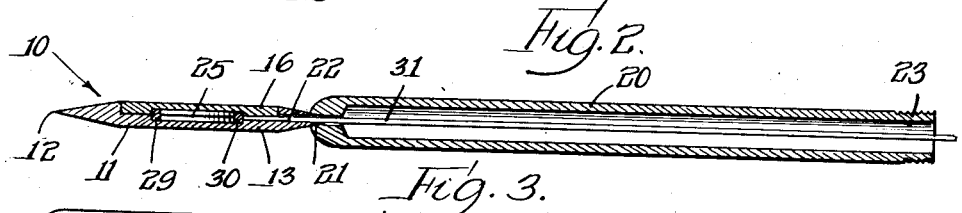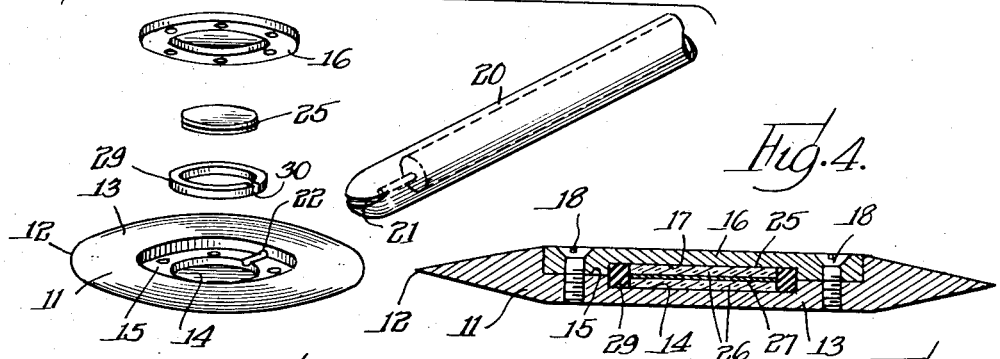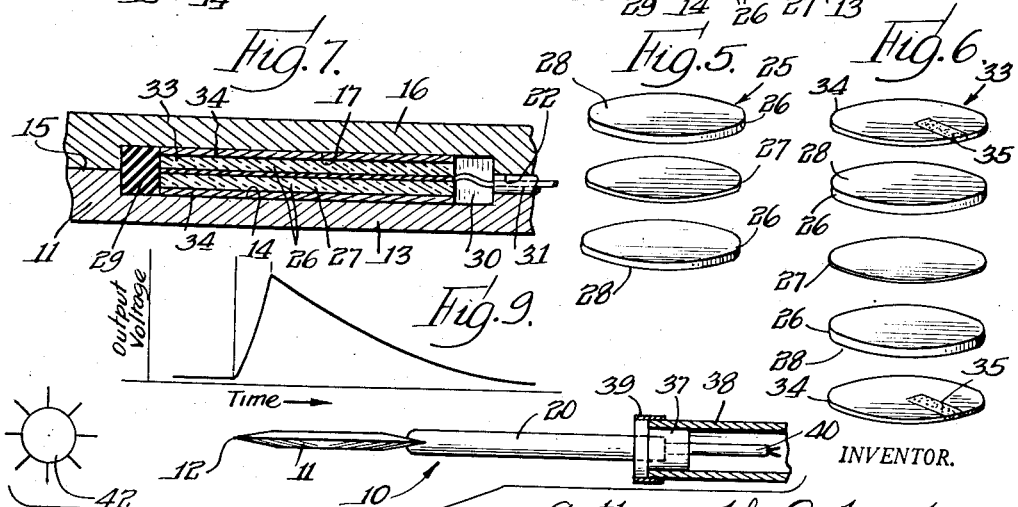

2,875,352

BLAST GAUGE

Anthony W. Orlacchio, Metuchen, N. J., assignor to Gulton Industries, Inc., a corporation of New Jersey Application March 4, 1953, Serial No. 340,341

13 Claims. (Cl. 310—8.1)

The principal object of this invention is to provide a blast gauge for responding to the force produced by a blast wherein an electrical voltage is accurately produced in accordance with the blast force, wherein the sensitivity of the blast gauge is high, wherein the blast gauge is simple and rugged in construction and foolproof in use and operation, and wherein the blast gauge may be inexpensively constructed.

Briefly, the blast gauge of this invention includes a substantially disc shaped housing having a tapered sharp peripheral edge and an internal compartment. Means are provided for supporting the housing with the tapered sharp edge thereof facing the blast point so as to compress the housing as the blast pressure passes over the faces thereof and to an extent depending upon the force of the blast pressure. A piezoelectric element is secured or clamped in the internal compartment of the housing and is compressed as the housing is compressed for producing a voltage in accordance with the compression thereof by the housing and hence in accordance with the force of the blast pressure acting on the housing.

The piezoelectric element is preferably a titanate ceramic element which has been polarized to make the same piezoelectric. It includes a pair of permanently polarized titanate ceramic discs mechanically and electrically bonded together with a common center electrode and separate outer electrodes. The outer electrodes are electrically connected to the housing either by directly engaging the housing or by conductors carried by electrical and heat insulating discs engaging the outer electrodes and the housing. A lead extends from the center electrode and is insulated therefrom. The electrical voltage so produced appears between the insulated lead and the housing. A split electrical and heat insulating washer is preferably placed about the edges of the ceramic discs and the split in the washer accommodates the insulated lead. The means for supporting the housing preferably includes a tube mechanically and electrically secured to the edge of the housing and the insulated lead extends through a hole in the housing into and through the tube. The housing is preferably made of two separate parts for clamping the piezoelectric element therebetween in the housingg compartment.

The tube and the insulated lead, across which the voltage is produced, may be connected to the input of a suitable amplifier, such as a cathode follower amplifier for impedance matching purposes, and the output of the amplifier may control an oscilloscope for obtaining a trace of the blast pulse. The blast sets up a wave front which passes over the housing and gives a sharp rising pulse which slowly falls off from the peak. This condition is indicated by the oscilloscope.

Further objects of this invention reside in the details of construction of the blast gauge and in the cooperative relationships between the component parts thereof.

Other objects and advantages of this invention will become apparent to those skilled in the art upon reference to the accompanying specification, claims and drawings in which:

Figure 1 is a top plan view of one form of the blast gauge of this invention.

Figure 2 is a vertical sectional view taken substantially along the line 2—2 of Figure 1.

Figure 3 is an exploded perspective view of the various parts forming the blast gauge illustrated in Figures 1 and 2.

Figure 4 is an enlarged vertical sectional view taken substantially along the line 4—4 of Figure 1.

Figure 5 is an exploded perspective view of one form of piezoelectric element utilized in the blast gauge of Figure 1.

Figure 6 is an exploded perspective view of another form of a piezoelectric element which may be utilized in the blast gauge of Figure 1 and thereby forming, or providing, another form of the blast gauge.

Figure 7 is an enlarged partial sectional view taken substantially along the line 4—4 of Figure 1, but illustrating the piezoelectric element disclosed in Figure 6.

Figure 8 is a view showing the manner of mounting the blast gauge and subjecting the same to the blast force.

Figure 9 is a chart illustrating the manner of operation of the blast gauge of this invention.

The blast gauge of this invention is generally designated at 10. It includes a substantially disc shaped housing 11 having a tapered sharp peripheral edge 12. The housing 11 is made of a suitable metal, such as brass. It is made in two parts; a part 13 and a part 16 which forms a cover for the part 13. The part 13 is centrally provided with a circular recess 14 and an annular recess 15. The other part 16 is provided with a circular recess 17 and fits within the part 13 and lies against the annular recess 15 thereof. The parts 13 and 16 are secured together by screws 18 and between them they form an internal compartment.

The peripheral edge of the part 13 of the housing 11 is received in a notch 21 in a tube 20. The tube 20 may be made of any suitable metal, such as brass. The housing 11 is secured to the tube 20 by silver solder or the like. The part 13 of the housing 11 is provided with a hole 22 which opens into the internal compartment and also into the interior of the tube 20. The other end of the tube 20 is preferably screw threaded as indicated at 23.

A substantially disc shaped piezoelectric element 25 is secured, or clamped, in the internal compartment of the housing, preferably under some initial pressure. The piezoelectric element 25 may be of any suitable construction, preferably it is formed from a titanate ceramic material, the details of which are shown in more detail in Figure 5. Here, the piezoelectric element 25 is formed from a pair of barium titanate ceramic discs 26 and a Phosphor bronze or copper disc 27 secured therebetween. The discs 26 are formed from thin sheets of titanate ceramic, such as substantially pure barium titanate ceramic. Each of these discs 26 have electrodes 28 secured to opposite faces thereof. The electrodes 28 may be formed on the ceramic discs 26 by applying suitable silver paste to the opposite faces thereof and then firing the paste to form a good bond between the electrodes and the ceramic elements. The ceramic elements, or discs, 26 are secured to the metal disc 27 in any suitable manner as by soldering the electrodes 28 thereto. The titanate ceramic discs 26 are permanently polarized to make the same piezoelectric. In this connection one terminal of a D. C. voltage source is connected to the center metallic disc 27 and the other terminal of the D. C. voltage source is connected to the outer electrodes 28. A sufficiently high D. C. voltage is applied to the outer exposed electrodes 28 and the center metallic disc 27 for a sufficiently long time so as permanently to polarize the titanate ceramic discs 26.

This piezoelectric element 25 formed in the foregoing manner is placed in the internal compartment of the housing 11. As the part 16 is secured to the part 13 of the housing by the screws 18 the piezoelectric element 25 is secured and clamped in the internal compartment of the housing, and with some initial pressure. A ring or washer 29 formed of electrical and heat insulating material, such as Bakelite, is located about the edge of the piezoelectric element 25 when it is inserted in the internal compartment of the housing. The purpose of the washer 29 is to electrically insulate the center metallic disc 27 from the housing 11 and also to provide some heat insulation. The outer electrodes 28 of the piezoelectric element physically and electrically contact the housing parts 13 and 16 so that these electrodes are conductively coupled to the housing and, hence, to the tube 20. A lead 31, which is insulated, is secured to the center metallic disc 27 as by soldering. This lead 31 and its insulation extend through a slit 30 in the ring or washer 29 and through the hole 22 in the housing part 13 into the interior of the tube 20. The insulation for the lead 31 may be a thin ceramic tubing, such as a steatite tube, and it is preferably potted in place in the tube 20 with a low melting wax, these holding the same rigidly in place. This prevents any capacitance that might occur due to the lead wire moving back and forth under the shock blast. Thus, as the housing 11 of the blast gauge is compressed, the piezoelectric element 25 is likewise compressed to produce a voltage in accordance with the amount of pressure. This voltage, so produced, appears across the lead 31 and the housing 11, and hence, the tube 20.

In Figures 6 and 7 there is illustrated another form of piezoelectric element, which may be utilized in the blast gauge. This other form of piezoelectric element is designated at 33 and is very much like that of Figures 4 and 5. It utilizes the same titanate ceramic discs 26 and center metallic disc 27 and electrodes 28 which are permanently secured together in the manner described above. The titanate ceramic discs 26 are permanently polarized in the manner described above. The piezoelectric element 33 differs from the piezoelectric element 25 by including a pair of electrical and heat insulating discs 34, which may be formed of any suitable material, such as varnished cambric sheets. These discs 34 are painted with a strip of air drying silver across one face around the edge to the other side, this being indicated at 35 in Figure 6. These silver strips 35 form conductors for electrically connecting the outer electrodes 28 to the housing parts 13 and 16 when the piezoelectric element 33 is secured within the enclosed compartment of the housing. The purpose of the discs 34 is to increase the heat insulation for the piezoelectric element. Here, also the piezoelectric element 33 is compressed as the housing is compressed to produce a voltage corresponding to the amount of pressure.

As shown in Figure 8, the screw threaded end 23 of the tube 20 is secured to a standard connector 37 which in turn is secured to a pipe 38 for mounting the gauge. The connector 37 may be secured in place in any suitable manner as by straps or bands 38. A cable 40 having a pair of leads electrically connected respectively to the tube 20 and the insulated lead 31 extends through the pipe 38 to a suitable amplifier. The amplifier may be a cathode follower type for impedance matching purposes, and the output of the amplifier may be connected to and control an oscilloscope for obtaining a trace of the blast pulse. The blast gauge 11 is pointed at the blast point 42 with the leading tapered sharp edge 12 along a line radially out from the blast point 42. The blast sets up air pressure which passes across the faces of the gauge housing 11 causing the same to be compressed to apply pressure to the piezoelectric elements 25 or 33. The piezoelectric elements produce an output voltage which is proportional to the pressure applied thereto, and, hence, proportional to the blast force. The pipe 38, which carries the blast gauge, may be 3 or 4 feet in length and is bolted to a solid concrete foundation so that the blast gauge is rigidly held in desired position with respect to the blast point.

The action of the blast gauge is illustrated in Figure 9 wherein the output voltage of the blast gauge is plotted with respect to time. When the blast occurs, it sets up a wave front which crosses the housing 11 and gives a sharp rising pulse which slowly falls off from the peak. The time of the sharp rising pulse is in the neighborhood of 25 micro seconds. Depending upon the strength of the blast, the blast gauge may be located nearer or farther away from the blast point for obtaining desired output voltages.

A blast gauge, which has given particularly satisfactory results, has generally the following dimensions: the housing being 2.25 inches in diameter and .146 inch thick with the thickest point tapering off to a sharp edge; the tube being ⅜ inch in diameter and 5 inches in length; the piezoelectric element being .5 inch in diameter and the titanate ceramic discs thereof being .041 inch thick, the Phosphor bronze disc being .004 inch thick, and the heat insulating discs being .006 inch thick. Such a unit having these dimensions has the following characteristics: an open circuit sensitivity of 100–150 milivolts/p. s. i.; a capacitance of 1500 to 2500 micro-microfarads; a temperature range of $-30°$ C. to $+90°$ C. and a frequency respone which is flat up to 100 kc. Since the piezoelectric element is small, the rise time is fast and the sensitivity is great. Because of the greater sensitivity, stages of amplification may be dispensed with and, thus, reduce the possibility of faulty operation in the field due to humidity, heat or cold. The high sensitivity of the blast gauge shows what is really happening at the blast point. Since the piezoelectric element is entirely encased it is protected from shatter, electrical shorts and the weather. The housing, being made of brass or the like, may be coated with a rubber so that there will be no rusting and so that it will withstand all kinds of weather conditions.

While for purposes of illustration two forms of this invention have been disclosed other forms thereof may become apparent to those skilled in the art upon reference to this disclosure, and, therefore, this invention is to be limited only by the scope of the appended claims.

I claim as my invention:

1. A blast gauge for responding electrically to the force produced by a blast emanating from a blast point and comprising, a substantially disc shaped outer housing having a tapered sharp peripheral edge, oppositely disposed relatively movable pressure responsive walls and an internal compartment between the walls, means for supporting the housing with the tapered sharp edge thereof facing the blast point so as to compress the housing walls as the blast pressure passes over said pressure responsive walls thereof and to an extent depending upon the force of the blast pressure, and a piezoelectric element responsive to compressive forces secured in the internal compartment of the housing and compressed as the housing walls are relatively moved toward each other for producing a voltage in accordance with the compression thereof by the housing walls and hence in accordance with the force of the blast pressure acting on the housing walls.

2. A blast gauge for responding electrically to the force produced by a blast emanating from a blast point and comprising, a substantially disc shaped outer housing having a tapered sharp peripheral edge, oppositely disposed relatively movable pressure responsive walls and an internal compartment between the walls, means for supporting the housing with the tapered sharp edge thereof facing the blast point so as to compress the housing walls as the blast pressure passes over said pressure responsive walls thereof and to an extent depending upon the force of the blast pressure, and a titanate ceramic element and which has been polarized to make the same piezoelectric secured in the internal compartment of the housing and compressed as the housing walls are relatively moved toward each other for producing a voltage in accordance with the compression thereof by the housing walls and hence in accordance with the force of the blast pressure acting on the housing walls.

3. A blast gauge for responding electrically to the force produced by a blast emanating from a blast point and comprising, a substantially disc shaped metallic outer housing having a tapered sharp peripheral edge, oppositely disposed relatively movable pressure responsive walls and an internal compartment between the walls, means for supporting the housing with the tapered edge thereof facing the blast point so as to compress the housing walls as the blast pressure passes over said pressure responsive walls thereof and to an extent depending upon the force of the blast pressure, and a piezoelectric element responsive to compressive forces secured in the internal compartment of the housing and including a pair of permanently polarized titanate ceramic discs mechanically and electrically bonded together with a common center electrode and separate outer electrodes, a lead extending from the center electrode and insulated from the housing, the outer electrodes being electrically connected to the housing, said piezoelectric element being compressed as the housing walls are relatively moved toward each other for producing a voltage between the lead and the housing in accordance with the compression thereof by the housing walls and hence in accordance with the force of the blast pressure acting on the housing walls.

4. A blast gauge for responding electrically to the force produced by a blast emanating from a blast point and comprising, a substantially disc shaped metallic outer housing having a tapered sharp peripheral edge, oppositely disposed relatively movable pressure responsive walls and an internal compartment between the walls, means for supporting the housing with the tapered sharp edge thereof facing the blast point so as to compress the housing walls as the blast pressure passes over said pressure responsive walls thereof and to an extent depending upon the force of the blast pressure, and a piezoelectric element responsive to compressive forces secured in the internal compartment of the housing and including a pair of permanently polarized titanate ceramic discs mechanically and electrically bonded together with a common center electrode and separate outer electrodes, a lead extending from the center electrode and insulated from the housing, the outer electrodes being electrically connected to the housing, said piezoelectric element being compressed as the housing walls are relatively moved toward each other for producing a voltage between the lead and the housing in accordance with the compression thereof by the housing walls and hence in accordance with the force of the blast pressure acting on the housing walls, said supporting means for the housing including a tube mechanically and electrically secured to the edge of the housing and the insulated lead extending through a hole in the housing and into and through the tube.

5. A blast gauge for responding electrically to the force produced by a blast emanating from a blast point and comprising, a substantially disc shaped metallic outer housing having a tapered sharp peripheral edge, oppositely disposed relatively movable pressure responsive walls and an internal compartment between the walls, means for supporting the housing with the tapered sharp edge thereof facing the blast point so as to compress the housing walls as the blast pressure passes over the faces thereof and to an extent depending upon the force of the blast pressure, and a piezoelectric element responsive to compressive forces secured in the internal compartment of the housing and including a pair of permanently polarized titanate ceramic discs mechanically and electrically bonded together with a common center electrode and separate outer electrodes, an electrical and heat insulating split ring arranged about the periphery of the discs, a lead extending from the center electrode through the split in the split ring and insulated from the housing, the outer electrodes being electrically connected to the housing, said piezoelectric element being compressed as the housing walls are relatively moved toward each other for producing a voltage between the lead and the housing in accordance with the compression thereof by the housing walls and hence in accordance with the force of the blast pressure acting on the housing walls.

6. A blast gauge for responding electrically to the force produced by a blast emanating from a blast point and comprising, a substantially disc shaped metallic outer housing having a tapered sharp peripheral edge, oppositely disposed relative movable pressure responsive walls and an internal compartment between the walls, means for supporting the housing with the tapered sharp edge thereof facing the blast point so as to compress the housing walls as the blast pressure passes over the faces thereof and to an extent depending upon the force of the blast pressure, and a piezoelectric element responsive to compressive forces secured in the internal compartment of the housing and including a pair of permanently polarized titanate ceramic discs mechanically and electrically bonded together with a common center electrode and separate outer electrodes, an electrical and heat insulating disc engaging each outer electrode and having a conductor thereon for electrically connecting the outer electrodes to the housing, a lead extending from the center electrode and insulated from the housing, said piezoelectric element being compressed as the housing walls are relatively moved toward each other for producing a voltage between the lead and the housing in accordance with the compression thereof by the housing walls and hence in accordance with the force of the blast pressure acting on the housing walls.

7. A blast gauge for responding electrically to the force produced by a blast emanating from a blast point and comprising, a substantially disc shaped metallic outer housing having a tapered sharp peripheral edge and an internal compartment between the walls, means for supporting the housing with the tapered sharp edge thereof facing the blast point so as to compress the housing walls as the blast pressure passes over the faces thereof and to an extent depending upon the force of the blast pressure, and a piezoelectric element responsive to compressive forces secured in the internal compartment of the housing and including a pair of permanently polarized titanate ceramic discs mechanically and electrically bonded together with a common center electrode and separate outer electrodes, an electrical and heat insulating disc engaging each outer electrode and having a conductor thereon for electrically connecting the outer electrodes to the housing, an electrical and heat insulating split ring arranged about the periphery of the discs, a lead extending from the center electrode through the split in the split ring and insulated from the housing, said piezoelectric element being compressed as the housing walls are relatively moved toward each other for producing a voltage between the lead and the housing in accordance with the compression thereof by the housing walls and hence in accordance with the force of the blast pressure acting on the housing walls.

8. A blast gauge for responding electrically to the force produced by a blast emanating from a blast point and comprising, a substantially disc shaped outer housing having a tapered sharp peripheral edge, and oppositely disposed relative movable pressure responsive walls and formed of two separable members which provide an internal compartment between the walls when the members are secured together, means for supporting the housing with the tapered sharp edge thereof facing the blast point so as to compress the housing walls as the blast pressure passes over the faces thereof and to an extent depending upon the force of the blast pressure, and a piezoelectric element responsive to compressive forces clamped in the internal compartment of the housing when the separable parts of the housing are secured together and compressed as the housing walls are relatively moved toward each other for producing a voltage in accordance with the compression thereof by the housing walls and hence in accordance with the force of the blast pressure acting on the housing walls.

9. A blast gauge for responding electrically to the force produced by a blast emanating from a blast point and comprising, a substantially disc shaped outer housing having a tapered sharp peripheral edge, and oppositely disposed relative movable pressure responsive walls and formed of two separable members which provide an internal compartment between the walls when the members are secured together, means for supporting the housing with the tapered sharp edge thereof facing the blast point so as to compress the housing walls as the blast pressure passes over the faces thereof and to an extent depending upon the force of the blast pressure, and a piezoelectric element responsive to compressive forces clamped in the internal compartment of the housing when the separable parts of the housing are secured together and compressed as the housing walls are relatively moved toward each other for producing a voltage in accordance with the compression thereof by the housing walls and hence in accordance with the force of the blast pressure acting on the housing walls, said means for supporting the housing including a tube secured to the edge of the housing, and electrical conducting means extending from the piezoelectric element through a hole in the housing and into and through the tube.

10. A blast gauge for responding electrically to the force produced by a blast emanating from a blast point and comprising, a substantially disc shaped outer housing having a tapered sharp peripheral edge, oppositely disposed relative movable pressure responsive walls and an internal compartment, means for supporting the housing with the tapered sharp edge thereof facing the blast point so as to compress the housing walls as the blast pressure passes over the faces thereof and to an extent depending upon the force of the blast pressure, and a piezoelectric element responsive to compressive forces secured in the internal compartment of the housing and compressed as the housing walls are relatively moved toward each other for producing a voltage in accordance with the compression thereof by the housing walls and hence in accordance with the force of the blast pressure acting on the housing walls, said means for supporting the housing including a tube secured to the edge of the housing, and electrical conducting means extending from the piezoelectric element through a hole in the housing and into and through the tube.

11. A blast gauge for responding electrically to the force produced by a blast emanating from a blast point and comprising, a substantially disc shaped metallic outer housing having a tapered sharp peripheral edge, oppositely disposed relative movable pressure responsive walls and an internal compartment, means for supporting the housing with the tapered sharp edge thereof facing the blast point so as to compress the housing walls as the blast pressure passes over the faces thereof and to an extent depending upon the force of the blast pressure, and a piezoelectric element responsive to compressive forces secured in the internal compartment of the housing and including a pair of permanently polarized titanate ceramic discs mechanically and electrically bonded together with a common center electrode and separate outer electrodes, an electrical and heat insulating split ring arranged about the periphery of the discs, a lead extending from the center electrode through the split in the split ring and insulated from the housing, the outer electrodes being electrically connected to the housing, said piezoelectric element being compressed as the housing walls are relatively moved toward each other for producing a voltage between the lead and the housing in accordance with the compression thereof by the housing walls and hence in accordance with the force of the blast pressure acting on the housing walls, said supporting means for the housing including a tube mechanically and electrically secured to the edge of the housing and the insulated lead extending through a hole in the housing and into and through the tube.

12. A blast gauge for responding electrically to the force produced by a blast emanating from a blast point and comprising, a substantially disc shaped metallic outer housing having a tapered sharp peripheral edge, oppositely disposed relative movable pressure responsive walls and an internal compartment, means for supporting the housing with the tapered sharp edge thereof facing the blast point so as to compress the housing walls as the blast pressure passes over the faces thereof and to an extent depending upon the force of the blast pressure, and a piezoelectric element responsive to compressive forces secured in the internal compartment of the housing and including a pair of permanently polarized titanate ceramic discs mechanically and electrically bonded together with a common center electrode and separate outer electrodes, an electrical and heat insulating ring engaging each outer electrode and having a conductor thereon for electrically connecting the outer electrodes to the housing, a lead extending from the center electrode and insulated from the housing, said piezoelectric element being compressed as the housing walls are relatively moved toward each other for producing a voltage between the lead and the housing in accordance with the compression thereof by the housing walls and hence in accordance with the force of the blast pressure acting on the housing walls, said supporting means for the housing including a tube mechanically and electrically secured to the edge of the housing and the insulated lead extending through a hole in the housing and into and through the tube.

13. A blast gauge for responding electrically to the force produced by a blast emanating from a blast point and comprising, a substantially disc shaped metallic outer housing having a tapered sharp peripheral edge, oppositely disposed relative movable pressure responsive walls and an internal compartment, means for supporting the housing with the tapered sharp edge thereof facing the blast point so as to compress the housing walls as the blast pressure passes over the faces thereof and to an extent depending upon the force of the blast pressure, and a piezoelectric element responsive to compressive forces secured in the internal compartment of the housing and including a pair of permanently polarized titanate ceramic discs mechanically and electrically bonded together with a common center electrode and separate outer electrodes, an electrical and heat insulating ring engaging each outer electrode and having a conductor thereon for electrically connecting the outer electrodes to the housing, an electrical and heat insulating split ring arranged about the periphery of the discs, a lead extending from the center electrode through the split in the split ring and insulated from the housing, said piezoelectric element being compressed as the housing walls are relatively moved toward each other for producing a voltage between the lead and the housing in accordance with the compression thereof by the housing walls and hence in accordance with the force of the blast pressure acting on the housing walls, said supporting means for the housing including a tube mechanically and electrically secured to the edge of the housing and the insulated lead extending through a hole in the housing and into and through the tube.

(References on following page)

References Cited in the file of this patent

UNITED STATES PATENTS

| | | |
|---|---|---|
| 1,409,341 | Harrison | Mar. 14, 1922 |
| 1,624,412 | Horton | Apr. 12, 1927 |
| 1,776,009 | Rieber | Sept. 16, 1930 |
| 1,975,516 | Nicolson | Oct. 2, 1934 |
| 2,250,496 | Postlethwaite | July 29, 1941 |
| 2,411,401 | Welch | Nov. 19, 1946 |
| 2,433,383 | Mason | Dec. 30, 1947 |
| 2,434,143 | Chilowsky | Jan. 6, 1948 |
| 2,448,352 | Carlin | Aug. 31, 1948 |
| 2,486,146 | Frondel | Oct. 25, 1949 |
| 2,527,217 | Hayes | Oct. 24, 1950 |
| 2,556,558 | Silverman | June 12, 1951 |
| 2,574,475 | Grogan | Nov. 13, 1951 |
| 2,576,155 | Trent | Nov. 27, 1951 |
| 2,636,134 | Arons et al. | Apr. 21, 1953 |
| 2,714,672 | Wright et al. | Aug. 2, 1955 |